US011364172B2

(12) United States Patent
Weiner et al.

(10) Patent No.: US 11,364,172 B2
(45) Date of Patent: Jun. 21, 2022

(54) WALKER HANDLES

(71) Applicant: Florence Weiner Revocable Living Trust, as amended, Miami, FL (US)

(72) Inventors: Florence Weiner, Miami, FL (US); Richard Holtzman, Allentown, PA (US)

(*) Notice: Subject to any disclaimer, the term of this patent is extended or adjusted under 35 U.S.C. 154(b) by 0 days.

(21) Appl. No.: 17/504,453

(22) Filed: Oct. 18, 2021

(65) Prior Publication Data

US 2022/0117830 A1 Apr. 21, 2022

Related U.S. Application Data

(60) Provisional application No. 63/093,296, filed on Oct. 18, 2020.

(51) Int. Cl.
 *A61H 3/04* (2006.01)
 *B62B 9/20* (2006.01)

(52) U.S. Cl.
 CPC ........... *A61H 3/04* (2013.01); *B62B 9/20* (2013.01); *A61H 2201/0157* (2013.01); *A61H 2201/0161* (2013.01); *A61H 2201/0192* (2013.01); *A61H 2201/1638* (2013.01)

(58) Field of Classification Search
 CPC .................................... A61H 3/04; B62B 9/20
 See application file for complete search history.

(56) References Cited

U.S. PATENT DOCUMENTS

| D359,713 | S  | * | 6/1995  | Leberfinger | D12/129 |
| 6,349,949 | B1 | * | 2/2002  | Gorringe | B62B 5/068 |
|  |  |  |  |  | 280/47.38 |
| 6,722,689 | B2 | * | 4/2004  | Kreamer | B62B 9/20 |
|  |  |  |  |  | 280/47.38 |
| 7,011,335 | B2 | * | 3/2006  | Kight | B62B 9/20 |
|  |  |  |  |  | 280/647 |
| 8,464,397 | B2 | * | 6/2013  | Arnold, IV | B62B 3/144 |
|  |  |  |  |  | 16/446 |
| 9,022,397 | B1 | * | 5/2015  | Prettyman | B62B 5/0447 |
|  |  |  |  |  | 280/47.34 |
| 9,795,825 | B2 | * | 10/2017 | Johnson | A63B 21/4045 |
| 2014/0300079 | A1 | * | 10/2014 | Rhodes | A61G 5/061 |
|  |  |  |  |  | 280/304.1 |

FOREIGN PATENT DOCUMENTS

DE 202019101695 U1 * 5/2019 ............ A61G 5/02

* cited by examiner

*Primary Examiner* — Noah Chandler Hawk

(57) ABSTRACT

In accordance with one or more embodiments of the invention, removably attachable walker handles are presented, including a substantially ring-shaped handle portion, a walker mating portion, and a fastening mechanism, where the handles provide expanded handles, vertically and horizontally, when engaged to a standard walker. The walker handles facilitate improved posture and handling when engaged with a standard walker.

8 Claims, 4 Drawing Sheets

WALKER HANDLES

CROSS-REFERENCE TO RELATED APPLICATIONS

This application claims the benefit of U.S. Provisional Application No. 63/093,296, filed Oct. 18, 2020. The contents of the above-identified application are incorporated by reference in their entirety as if recited in full herein.

BACKGROUND OF THE INVENTION

Field of Invention

The inventions disclosed herein generally relate to removably attachable handles for standard walkers. More particularly, the inventions relate to making standard walkers and their use more accessible to people with limited mobility or dexterity, often related to disabilities or age related challenges. The inventions facilitate use of a traditional walker, with the ability to stand up more straight than is allowed by traditional handles. The inventions may provide for: less strain, e.g. on wrists and back; less bending forward; many positions to hold; assistance based on hand disabilities; improved posture; easier steering of a walker; easy assembly without the requirement of tools; and preferably fits most standard walkers.

Description of Related Art

Traditional walkers are generally standardized, and are not optimal for broad ranges of users. Traditional walkers typically have handles at a low height, which causes strain on wrists and backs, and requires users to bend over during use, which can cause additional problems. The use of a traditional walker can therefore cause additional problems for users, but they are still ubiquitous.

BRIEF SUMMARY OF EMBODIMENTS OF THE INVENTION

Aspects of the inventions include removably attachable walker handles, the walker handles comprising: a substantially ring-shaped handle portion; a walker mating portion; and a fastening mechanism; where the handle portion provides expanded handles, vertically and horizontally, when engaged to a standard walker; where the mating portion includes a walker with cushion mating portion and a walker without cushion mating portion; and where the walker handles may be attached to or removed from a standard walker without requiring tools.

Aspects of the inventions may include: where the handle portion is substantially ring-shaped along approximately three-quarters of a full ring; where the fastening mechanism comprises a bolt and ribbed slot apparatus; where the fastening mechanism includes a threaded knob; where the fastening mechanism accepts insertion of a center block for engagement with a standard walker; where the fastening mechanism incudes a threaded knob, engaged with a bolt, through the center block.

Aspects of the inventions may include a method of providing expanded handles, vertically and horizontally, to a standard walker, without requiring the use of tools, the method comprising: sliding a mating portion of a removably attachable walker handle onto a walker frame, over a portion of a cushion grip on the walker frame; inserting a block into the mating portion; inserting a bolt into a slot on one side of the mating portion, through the block, and through the other side of the mating portion; and fastening a threaded knob to an end portion of the bolt; where the expanded handles include a substantially ring-shaped handle portion, a walker mating portion, and a fastening mechanism, where the mating portion includes a walker with cushioning mating portion and a walker without cushion mating portion. Aspects may further include where the handle portion is substantially ring-shaped along approximately three-quarters of a full ring.

BRIEF DESCRIPTION OF THE DRAWINGS

For a more complete understanding of various embodiments of the present invention, reference is now made to the following descriptions taken in connection with the accompanying drawings in which:

FIG. 5A illustrates walker handle elements. FIG. 5B illustrates a walker handle engaging with a standard walker. FIG. 5C illustrates inserting a block into an exemplary walker handle. FIG. 5D illustrates attaching an exemplary walker handle to a standard walker.

DETAILED DESCRIPTION OF EMBODIMENTS OF THE INVENTION

Figure 1:
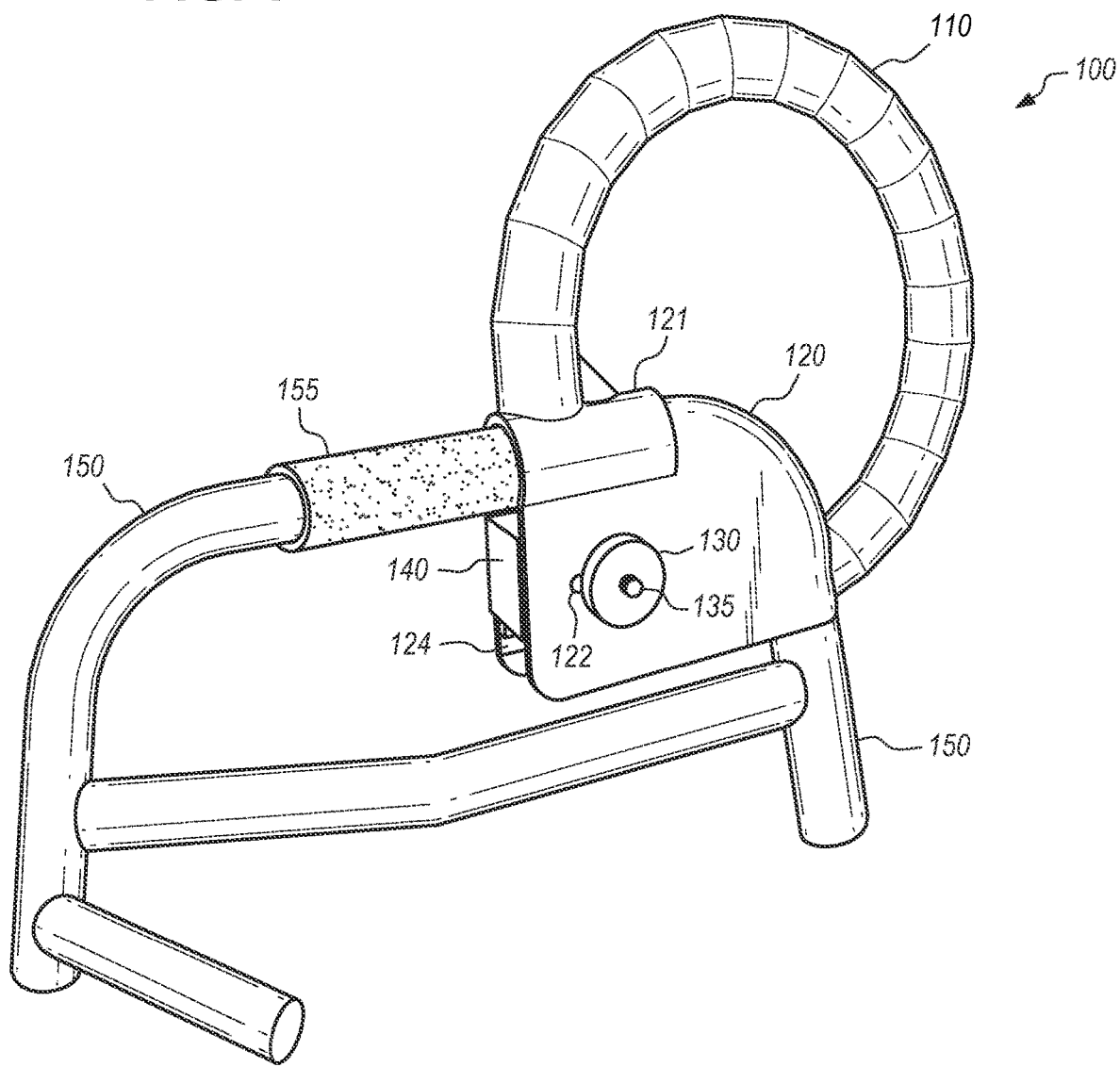
FIG. 1 illustrates an exemplary walker handle, engaged with a portion of a standard walker.

FIG. 1 illustrates exemplary walker handle 100, including substantially ring-shaped handle portion 110, walker mating portion 120, including walker with cushion mating portion 121. Threaded knob 130 is illustrated engaged with an end portion of bolt 135, through ribbed slot 122 on both sides of walker mating portion 120. Also illustrated are center block 140, illustrated fully inserted into walker mating portion 120, and above ribs 124. FIG. 1 illustrates walker handle 100 engaged to standard walker 150, including cushion grip 155. As illustrated in FIG. 1, walker with cushion mating portion 121 mates with cushion grip 155 portion of standard walker 150. As illustrated, walker handle 100 provides expanded handles, vertically and horizontally, when engaged to a standard walker.

Figure 2:
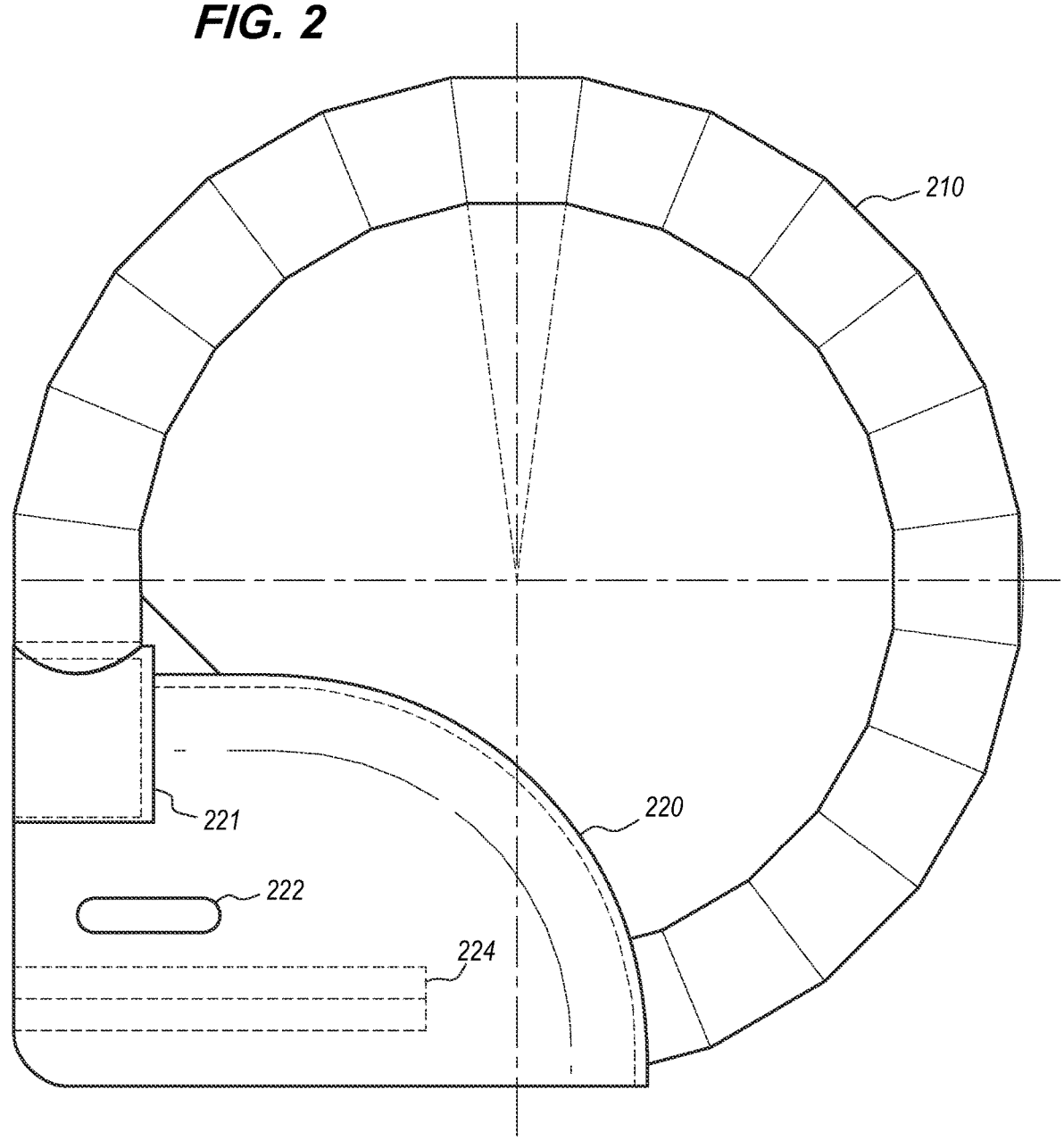
FIG. 2 illustrates a side view of an exemplary walker handle.

FIG. 2 illustrates a side view of an exemplary walker handle. Substantially ring-shaped portion 210 is illustrated. This portion may extend, as illustrated, approximately three-quarters of a full ring. Walker mating portion 220 is illustrated, and mates with a portion of standard walker handles, not illustrated in this figure. Walker mating portion 220 includes walker with cushion mating portion 221, which is adjacent walker without cushion mating portion. Slot 222 is also illustrated, and ribs 224.

Figure 3:
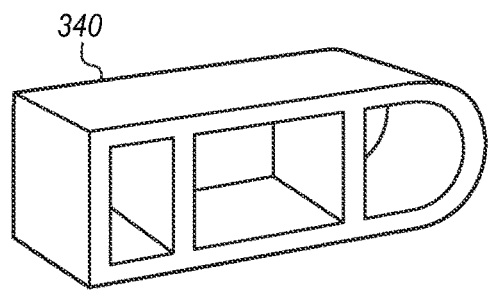
FIG. 3 illustrates an exemplary center block.

FIG. 3 illustrates exemplary center block 340. Center block 340 may take several shapes, and may have one side flattened and one side rounded. Center block 340 is used for removably attaching the walker handles to a standard walker.

Figure 4:
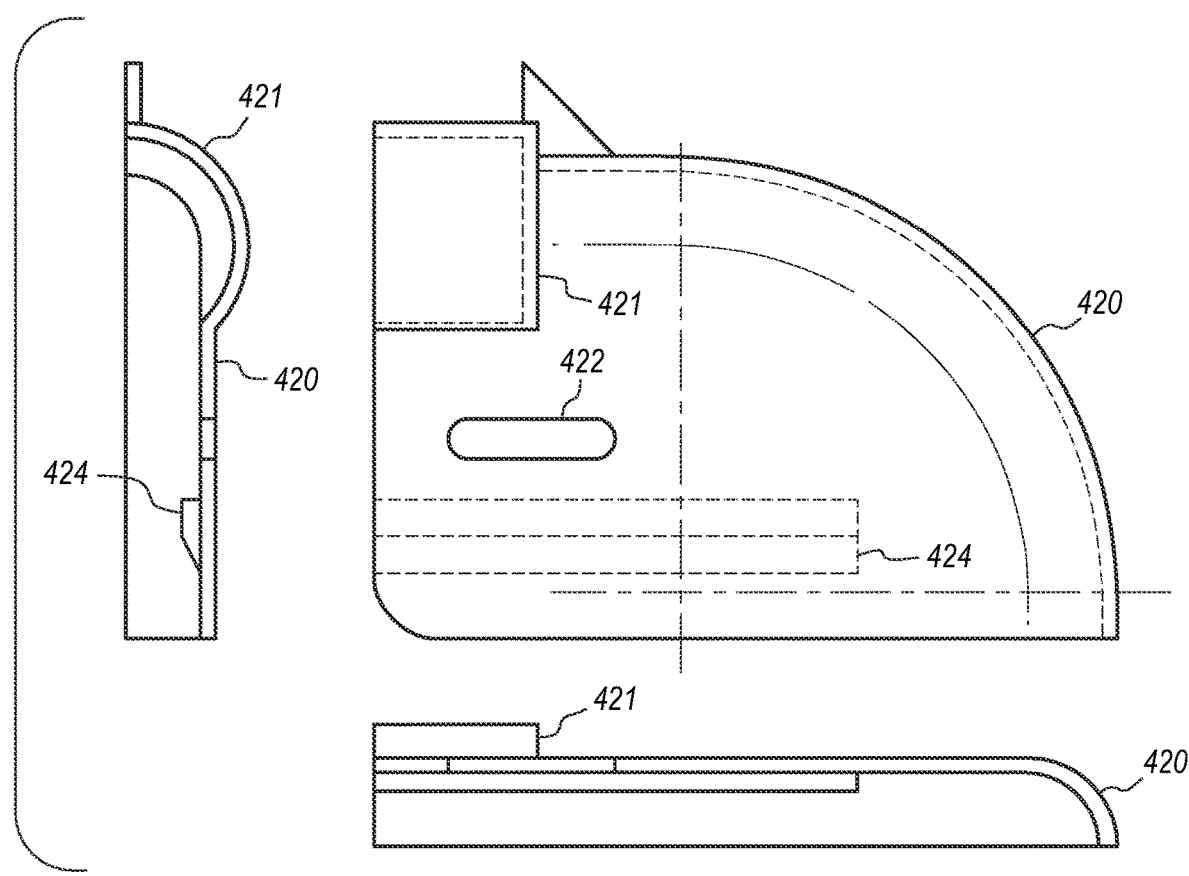
FIG. 4 illustrates a side view of an exemplary walker handle and related views.

FIG. 4 illustrates a side view of an exemplary walker handle and related views. Walker mating portion 420 is illustrated, including walker with cushion mating portion 421, and walker without cushion mating portion located to its right. Walker with cushion mating portion 421 has a larger diameter in order to accept a cushioned portion of a standard walker. Slot 422 is also illustrated, along with ribs 424.

Figure 5A:
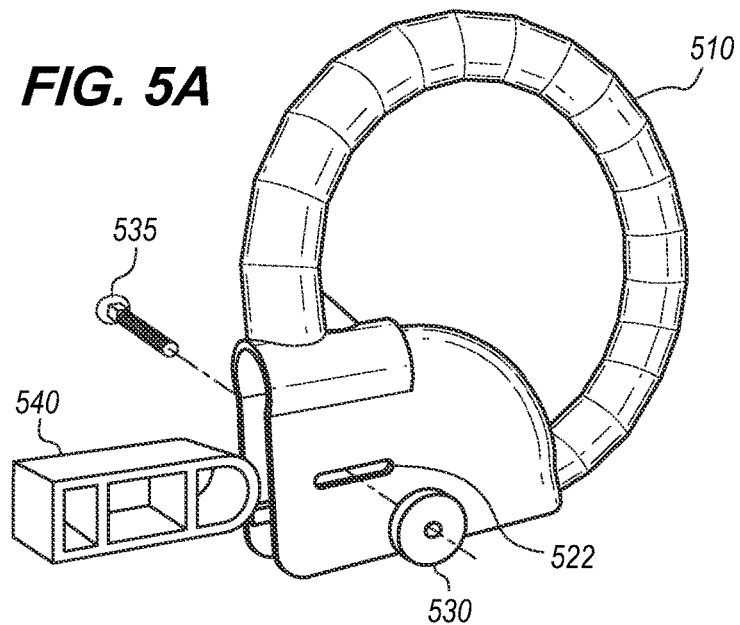
FIGS. 5A, 5B, 5C, and 5D illustrate a method of attaching walker handles to a standard walker.
Figure 5B:
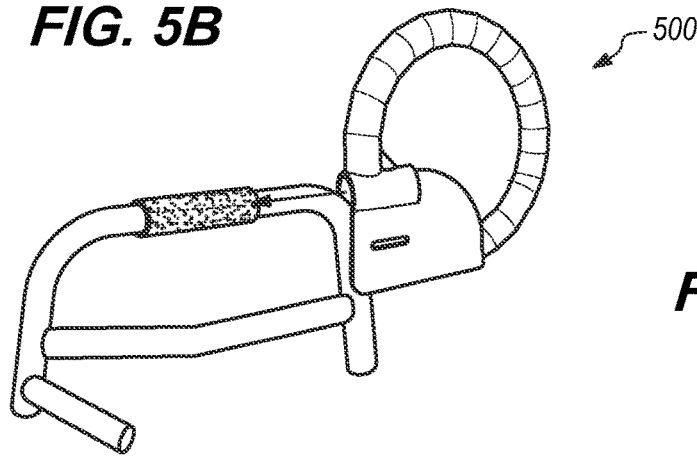
Figure 5C:
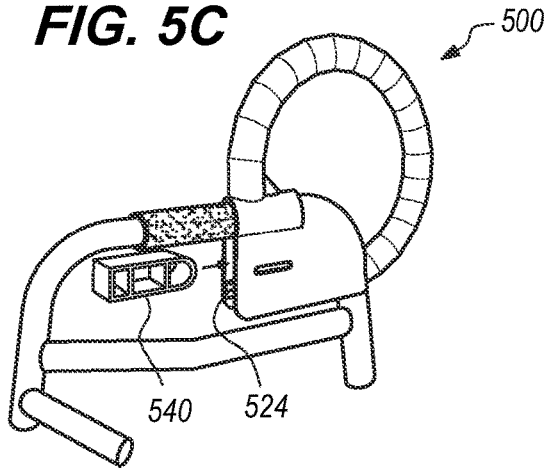
Figure 5D:
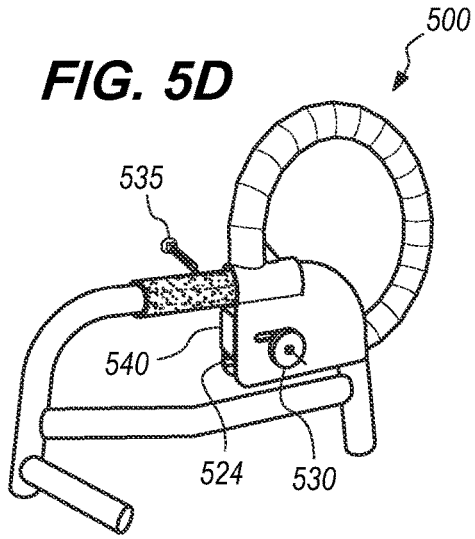

FIGS. 5A, 5B, 5C, and 5D illustrate a method of attaching walker handles to a standard walker. FIG. 5A illustrates walker handle elements, including substantially ring-shaped handle portion 510. Threaded knob 530 is illustrated, with bolt 535, and slot 522 on both sides of the walker mating portion. Also illustrated is center block 540. FIG. 5B illustrates walker handle 500, as walker handle 500 is slid onto the standard walker frame, and eventually over a portion of the cushion grip. FIG. 5C illustrates inserting center block 540 into a portion of exemplary walker handle 500. FIG. 5C also illustrates ribs 524. Block 540 is inserted into a portion of walker handle 500, above ribs 524. FIG. 5D illustrates attaching exemplary walker handle 500 to a standard walker, and illustrates bolt 535, threaded knob 530, block 540, and ribs 524. Bolt 535 is inserted into the slot in walker handle 500 from one side, through center block 540, through the slot in walker handle 500 on the other side, and engaged with threaded knob 530, to tighten and secure walker handle 500 onto the standard walker. Walker handles 500 provide expanded handles, vertically and horizontally, to a standard walker.

Walker Handles: The walker handles as described provide many benefits: they help a user to stand up more straight; provide for less strain on wrists and back; reduce bending forward necessary to use a walker; are great for hand disabilities; provide many positions to be held; improve posture; make it easier to steer an engaged walker; require no tool for assembly; and fit most standard walkers.

As will be realized, the systems and methods disclosed herein are capable of other and different embodiments and its several details may be capable of modifications in various respects, all without departing from the invention as set out in the appended claims. Accordingly, the drawings and description are to be regarded as illustrative in nature and not in a restrictive or limiting sense with the scope of the application being indicated in the claims.

What is claimed is:

1. Removably attachable walker handles, the walker handles comprising:
    a substantially ring-shaped handle portion;
    a walker mating portion; and
    a fastening mechanism;
    where the handle portion provides expanded handles, vertically and horizontally, when engaged to a standard walker;
    where the mating portion includes a walker with cushion mating portion and a walker without cushion mating portion; and
    where the walker handles may be attached to or removed from a standard walker without requiring tools.

2. The walker handles of claim 1, where the handle portion is substantially ring-shaped along approximately three-quarters of a full ring.

3. The walker handle of claim 1, where the fastening mechanism comprises a bolt and ribbed slot apparatus.

4. The walker handle of claim 3, where the fastening mechanism includes a threaded knob.

5. The walker handles of claim 1, where the fastening mechanism accepts insertion of a center block for engagement with a standard walker.

6. The walker handles of claim 5, where the fastening mechanism incudes a threaded knob, engaged with a bolt, through the center block.

7. A method of providing expanded handles, vertically and horizontally, to a standard walker, without requiring the use of tools, the method comprising:
    sliding a mating portion of a removably attachable walker handle onto a walker frame, over a portion of a cushion grip on the walker frame;
    inserting a block into the mating portion;
    inserting a bolt into a slot on one side of the mating portion, through the block, and through the other side of the mating portion; and
    fastening a threaded knob to an end portion of the bolt;
    where the expanded handles include a substantially ring-shaped handle portion, a walker mating portion, and a fastening mechanism, where the mating portion includes a walker with cushioning mating portion and a walker without cushion mating portion.

8. The method claim 7, where the handle portion is substantially ring-shaped along approximately three-quarters of a full ring.

* * * * *